(12) United States Patent
Bär et al.

(10) Patent No.: US 6,340,282 B1
(45) Date of Patent: Jan. 22, 2002

(54) HANDLING DEVICE FOR FEEDING AND/OR REMOVING WORKPIECES

(75) Inventors: Ralf Bär, Gemmingen; Georg Deponte, Schwaigern, both of (DE)

(73) Assignee: Arthur Bär GmbH, Gemmingen (DE)

( * ) Notice: Subject to any disclaimer, the term of this patent is extended or adjusted under 35 U.S.C. 154(b) by 0 days.

(21) Appl. No.: 09/601,985

(22) PCT Filed: Feb. 4, 1999

(86) PCT No.: PCT/DE99/00293

§ 371 Date: Aug. 9, 2000

§ 102(e) Date: Aug. 9, 2000

(87) PCT Pub. No.: WO99/41037

PCT Pub. Date: Aug. 19, 1999

(30) Foreign Application Priority Data

Feb. 10, 1998 (DE) .......................................... 198 05 206

(51) Int. Cl.[7] .............................................. B65G 59/00
(52) U.S. Cl. ................ 414/788.7; 414/795.8; 414/796.9; 414/416.07
(58) Field of Search .......................... 414/788.7, 789.9, 414/792.9, 795.8, 796.9, 416

(56) References Cited

U.S. PATENT DOCUMENTS

| 4,541,762 A | * | 9/1985 | Tischler et al. | ........... 414/788.7 |
| 5,645,392 A | * | 7/1997 | Leichty et al. | ........... 414/788.7 |

FOREIGN PATENT DOCUMENTS

| DE | 25 35 680 | 2/1977 |
| DE | 31 51 316 | 7/1983 |
| DE | 3810657 | 3/1988 |
| DE | 39 10 705 | 10/1990 |
| DE | 4409532 | 9/1995 |
| DE | 4411555 | 10/1995 |
| EP | 0098573 | 7/1983 |
| EP | 1. 0 673 711 | 9/1995 |
| GB | 1 547470 | 7/1977 |
| SU | 1569179 | * 6/1990 ............... 414/796.9 |

OTHER PUBLICATIONS

Hesse, Stefan, "Automatisierung mit Palettenwechslern", Technica 3/94, pp. 22–24.
"Flexible Palettieranlagen mit Robotern", Maschinenmarkt, Wurzburg 102, 1996, 35, p. 26.
Prospekt: kk information Nr 15, FLEXIMAG Palettiersystem, kk Automation,, Neckarsulm, 1980, 8 pages.

* cited by examiner

*Primary Examiner*—H. Grant Skaggs
(74) *Attorney, Agent, or Firm*—Darby & Darby

(57) ABSTRACT

A handling device for feeding and/or removing workpieces as unfinished parts to and/or from machining or assembly equipment for machining and/or assembly purposes and for picking up workpieces as finished parts after machining and/or assembly has a feed position, at least one intermediate position and a removal position, in which in each case there are workpiece-carrier stack units comprising workpiece carriers which are arranged one above another, the workpiece carriers in turn being populated with the workpieces. A workpiece-carrier handling unit removes the workpiece carriers in a pick-up position and sets them down again in a removal position after machining, it being possible for these positions to be defined via a control device. A device of this type contributes to reducing the downtimes in machining equipment and has a beneficial influence on the cycle-time intervals during the machining of workpieces.

14 Claims, 4 Drawing Sheets

HANDLING DEVICE FOR FEEDING AND/OR REMOVING WORKPIECES

TECHNICAL FIELD

The invention relates to a handling device for feeding and/or removing workpieces as unfinished parts to and/or from machining or assembly equipment for machining and/or assembly purposes and for picking up workpieces as finished parts after machining and/or assembly, having workpiece carriers, on which the workpieces are arranged, workpiece-carrier stack units, which have workpiece carriers arranged one above another, a workpiece handling unit, which removes the workpieces from the respective workpiece carriers and feeds them to the machining and/or assembly equipment and, after machining/assembly, sets them down again on the workpiece carrier, a workpiece-carrier handling unit, which feeds the respective workpiece carriers having unmachined workpieces and belonging to a workpiece-carrier stack unit to the workpiece handling unit, from a pick-up position into a standby position and, after its workpieces have been machined, sets this workpiece carrier down from the standby position into a set-down position of a further workpiece-carrier stack unit, a stack transport unit, which transports the workpiece-carrier stack units within the device in the transport direction, specifically from a feed position to which the workpiece-carrier stack units having the unmachined workpieces are fed from outside, as far as a removal position, from which the workpiece-carrier stack units having the machined workpieces are removed to the outside.

PRIOR ART

Handling devices of the type mentioned at the beginning are known, and are used for charging machining/assembly machines and the like. In the process, the workpieces are stored on workpiece carriers, fed pallet by pallet, machined and removed again pallet by pallet. In this case, use is generally made of a pallet transfer device having two controlled axes in the horizontal direction and in the vertical direction, to which outside the working area, via a belt, workpiece carriers having unmachined workpieces can be fed, it being possible for workpiece carriers with machined workpieces to be removed from the working area via a further belt. As a rule, the workpiece carriers are transferred to a handling unit which transfers the pallet to a defined machining position. Individual workpieces are accepted from the machining position, for example by means of grippers or other handling units, and fed to the machining equipment. Following machining, the workpieces are in turn deposited on a pallet. These pallets are in turn arranged to form a stack and are removed stack by stack from the device following complete machining.

Devices of this type are relatively complicated, since it is necessary to ensure continuous monitoring of the handling system, which goes counter to a complete automation process.

EP-0 673 711 discloses a handling system in which there is an operating area which is sealed off from the outside by a protective wall and within which a pallet transfer unit is provided in order to provide workpiece carriers with unmachined workpieces and to pick up workpiece carriers following machining. The workpiece carriers are fed into the operating area by means of a rotary table with an H-shaped rotary frame, into which workpiece-carrier stacks can be moved on roller carriages. The rotary table has a protective wall section, by means of which the operating area can be separated off completely from a charging area, so that during the machining of the workpiece carriers within the operating area, the workpiece-carrier stacks can be changed in the loading area without any risk. For the purpose of presentation, the workpiece-carrier stacks must be restacked, which ultimately means that there is a loss in time.

SUMMARY OF THE INVENTION

On the basis of the aforementioned prior art, the present invention is based on the object and the technical problem of specifying an improved handling device for feeding workpieces which, with the effect of economic use, makes an increase in automation possible.

In addition, an improved method of handling workpieces is to be specified, which ensures economic use and permits simple implementation in design terms.

The handling device according to the invention is accordingly distinguished by the fact that between the feed position and removal position there is at least one further intermediate position for one workpiece-carrier stack unit in each case, the stack transport unit is constructed such that it can displace at least two workpiece-carrier stack units arranged upstream of the removal position by one position in the transport direction to the removal position, a control device being constructed such that it activates the components in such a way that the workpiece-carrier handling unit removes the workpiece carriers having workpieces to be machined in a pick-up position and, after their workpieces have been machined, sets the workpiece carriers down in a set-down position, i.e. the pick-up position is in particular designed to be adjacent to the set-down position, as soon as there is a completely machined workpiece-carrier stack unit in the removal position, the pick-up and set-down positions of the workpiece-carrier handling unit are displaced by one position in the direction opposite to the transport direction, after the workpiece-carrier stack unit has been removed from the removal position, the workpiece-carrier stack units located upstream of the removal position are displaced at least partly by one position in the transport direction by means of the stack transport unit and, at the same time, the pick-up position and set-down position of the workpiece-carrier handling unit is also displaced by one position in the transport direction and, as a result, a workpiece-carrier stack unit having workpiece carriers with unmachined workpieces can be introduced into the feed position. As a result of the device according to the invention, the necessary restacking of the workpiece-carrier stacks, which is required in the prior art before the workpieces are presented to the machining equipment, is dispensed with, which reduces the down-times of the machining device and is associated with a beneficial influence on the cycle-time intervals during the machining of the workpieces.

A preferred configuration of the inventive device is distinguished by the fact that between the feed position and the removal position there is a single intermediate position.

A device that can be implemented particularly simply in design terms is distinguished by the fact that the workpiece-carrier handling unit can be displaced about a horizontal and vertical axis, and the transport direction of the stack transport unit is arranged essentially parallel to the horizontal axis of the workpiece-carrier handling unit.

A configuration which is particularly preferred with regard to increased operating safety is distinguished by the fact that there are mobile protecting walls which, when workpiece-carrier stack units are being fed or when workpiece-carrier stack units are being removed, block off the area of the adjacent position, in which machining takes place.

A configuration which is particularly preferred with regard to a simple constructional design of the stack transport unit is distinguished by the fact that the stack transport unit has a linear guide and, between the respective workpiece-carrier stack units, has projecting units that can be pivoted in, a particularly advantageous development being distinguished by the fact that the stack transport unit has a rotary-shaft unit on which there are projecting units which are arranged so that they can be displaced longitudinally by means of an assembly and rotated by means of an assembly.

A further advantageous configuration of the handling device according to the invention is distinguished by the fact that the stack transport unit has a chain drive with assemblies that can be activated, or the stack transport unit has a push-rod drive which can be activated via drive assemblies.

During the machining of workpieces with correspondingly long machining times, that is to say during processes which are not critical in terms of their cycle time, the task of the workpiece-carrier handling unit with respect to the transport can perform the tasks of the stack transport unit, as a result of which the latter can be dispensed with.

The method according to the invention of handling workpieces which are mounted on workpiece carriers, the said workpiece carriers being stacked to form workpiece-carrier stack units, the workpiece-carrier stack units being fed to a feed position from outside, fed in the transport direction by means of a stack transport unit or a workpiece-carrier handling unit to a removal position, the workpiece-carrier handling unit feeding the individual workpiece carriers to a standby position, to which the workpiece handling unit makes access, having the following method steps:

a) feeding a workpiece-carrier stack unit to the feed position from outside, b) transporting the workpiece-carrier stack unit in the transport direction into an intermediate position, c) if appropriate, repeating steps a) to c) in accordance with the number of intermediate positions, d) removing a workpiece carrier by means of the workpiece-carrier handling unit from an intermediate position currently defined as a pick-up position to feed it to a machining position, e) removing the workpieces and feeding machining/assembly equipment by means of the workpiece handling unit and setting the workpiece down on the workpiece carrier after machining, until the workpieces of the respective workpiece carrier have been machined completely, f) removing the workpiece carrier from the machining position by means of the workpiece-carrier handling unit and setting it down in the removal position currently defined as the set-down position, g) repeating steps d) to f) until the workpiece-carrier stack unit in the current pick-up position has been processed completely, h) displacing the current pick-up and set-down positions in the direction opposite to the transport direction by at least one position and removing the machined workpiece-carrier stack unit from the removal position, j) displacing the workpiece-carrier stack units arranged upstream of the removal position by one position in the transport direction and simultaneously displacing the pick-up/set-down positions of the workpiece-carrier handling unit by one position in the transport direction, k) feeding a further workpiece-carrier stack unit into the feed position from outside, l) repeating method steps d) to j).

A particularly preferred configuration of the method according to the invention is distinguished by the fact that the pick-up position and the set-down position for the stack unit are designed to be adjacent, it being preferable for the offset between the pick-up/set-down positions for the workpiece-carrier handling unit to be preferably one position unit counter to or in the transport direction.

A particularly compact plant is achieved if, according to the invention, a feed position, an intermediate position and a removal position are provided, these positions advantageously being arranged parallel with the horizontal displacement axis of the workpiece-carrier handling unit.

A particularly preferred configuration of the method according to the invention is distinguished by the fact that the workpiece-carrier stack units located upstream of the removal position are displaced by the stack transport unit or workpiece-carrier handling unit in a transport direction (T) which runs parallel to the horizontal axis (H) of the workpiece-carrier handling unit.

There are situations in which the workpiece handling unit initially has to populate the machining equipment with a predefined number of workpieces, in order that the said equipment starts machining. Taking account of this configuration, a preferred configuration of the method of the invention consists in the workpiece handling unit feeding a set of workpieces from a workpiece-carrier unit individually or jointly to the machining equipment, the workpiece-carrier unit which is then emptied being fed to an intermediate storage position, after the processing of all the workpiece-carrier/stack units to be machined, the workpieces still in the machining equipment being fed to the empty workpiece carrier unit. This option is not possible in the known methods, since in this method restacking of the workpiece-carrier stack introduced into the operating area necessarily has to be carried out. With this feature, the method according to the invention assures the correct batch processing of the respective workpiece carriers.

Further embodiments and advantages of the invention emerge from the features further listed in the claims, and from the exemplary embodiments specified below. The features of the claims can be combined with one another in any desired way, provided that they are not obviously mutually exclusive.

BRIEF DESCRIPTION OF THE DRAWING

The invention and advantageous embodiments and developments of the same will be explained in more detail below using the examples illustrated in the drawing. According to the invention, the features to be taken from the description and the drawing can be used individually on their own or in a plurality, in any desired combination. In the drawing.

DETAILED DESCRIPTION OF THE PREFERRED EMBODIMENTS

Figure 2:
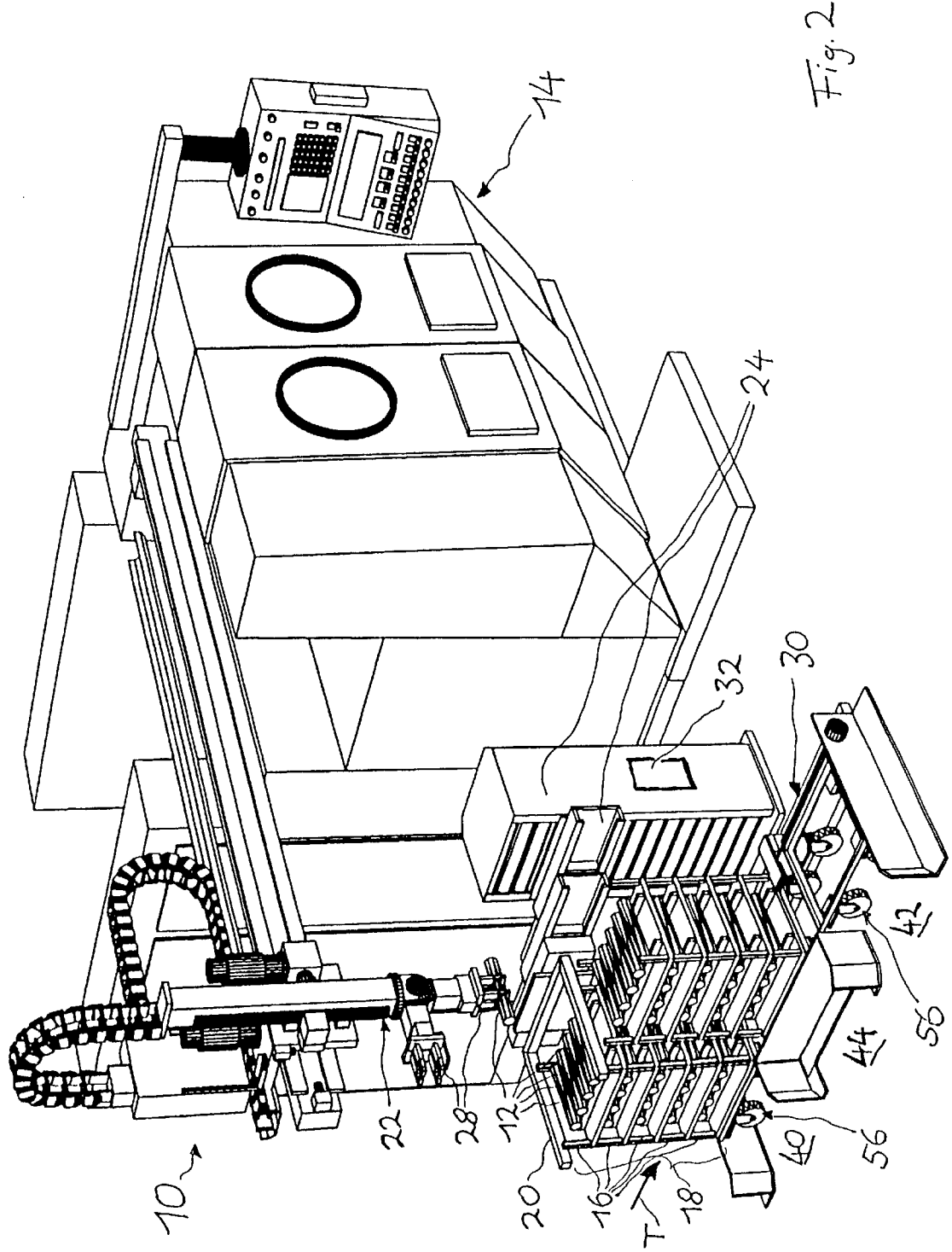
FIG. 2 shows a schematic perspective illustration of a handling device having machining equipment arranged downstream, but without illustrating any protective walls and protective doors which may be present.

FIG. 2 illustrates, in schematic form, machining equipment 14 which, according to the selected illustration, has a handling device 10 in its left front area. The machining equipment 14 machines workpieces 12, which are fed to it individually by the handling device 10.

For this purpose, the handling device 10 has a workpiece handling unit 22 having a gripper 28, which picks up the respective workpiece 12 to be machined, feeds it to the machining equipment 14 and sets it down again after machining. This gripper 28 is constructed as a double-acting gripper, in such a way that it grips the workpiece to be removed and at the same time sets down the machined workpiece.

The handling device 10 also has a workpiece-carrier handling unit 20, which feeds workpiece carriers 16 which are populated with workpieces 12 and are present within a workpiece-carrier stack unit 18, to a defined machining position for the workpiece handling unit 22 to remove the workpiece 12 to be machined and set it down again.

The workpiece-carrier handling unit 20 is mounted on a supporting unit 24 such that it can be displaced along a horizontal axis H and a vertical axis V. The movement of the workpiece-carrier handling unit 20 is controlled via a control unit 32 illustrated schematically in FIG. 2.

In addition, the handling device 10 has a feed position 40 and a removal position 42, a workpiece-carrier stack unit 18 being fed from outside in the feed position 40, and it being possible for a workpiece-carrier stack unit 18 to be removed to the outside in the removal position 42. Between the feed position 40 and removal position 42 there is an intermediate position 44. Also present is a stack transport unit 30, which permits the workpiece-carrier stack units 18 to be transported from the feed position 40 to the removal position 42 via the intermediate position 44.

The movements of the stack transport unit 30 are controlled by the control unit 32 and are carried out by means of assemblies which are not specifically illustrated.

Figure 1:
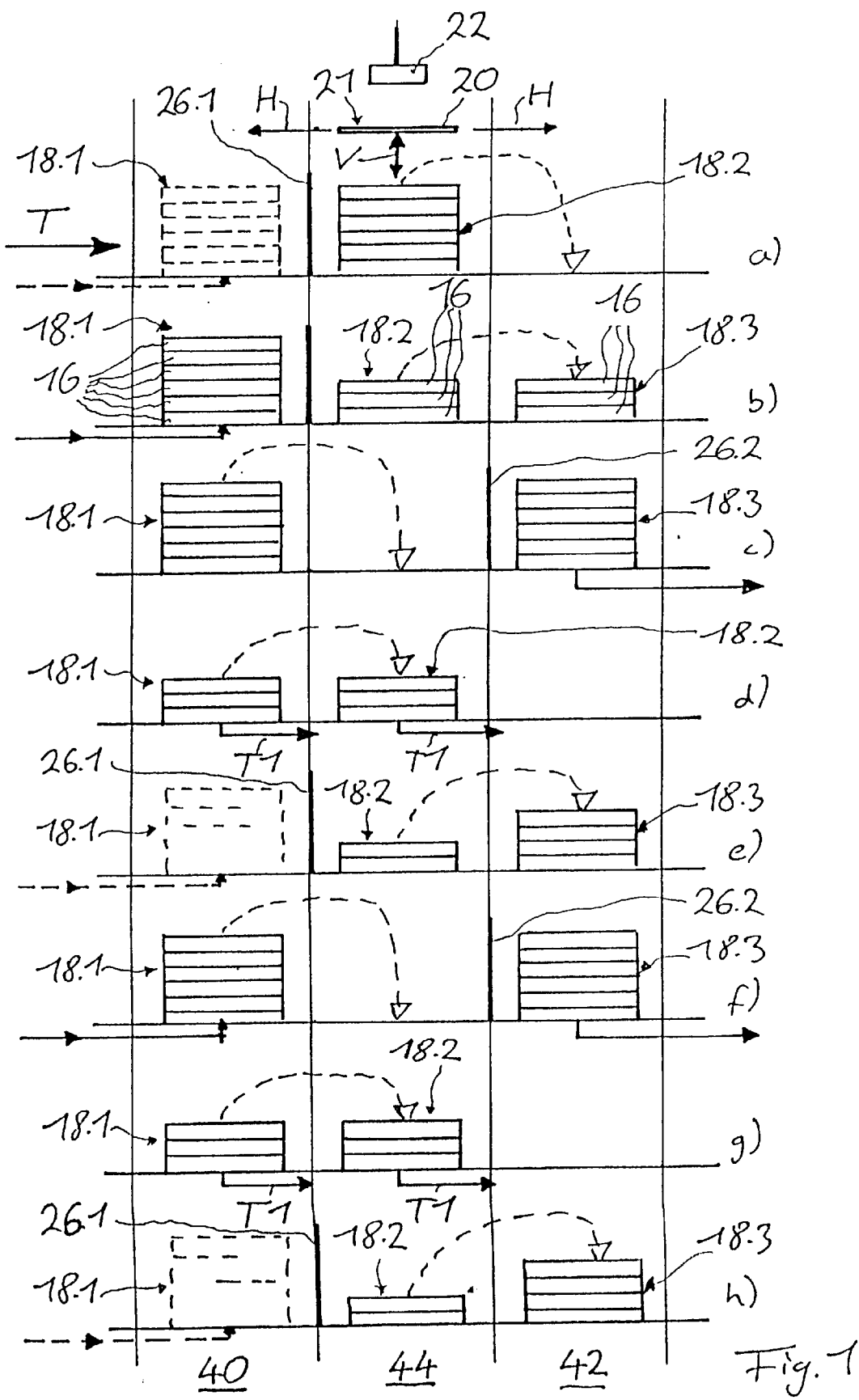
FIG. 1 shows a schematic method sequence of restacking the individual workpiece carriers to form workpiece-carrier stack units during the method sequence.

FIG. 1 illustrates in schematic form the processing of the respective workpiece-carrier stack units 18.1, 18.2, 18.3 in the course of the method. The feed position 40, the intermediate position 44 and the removal position 42 are fixed in place and are located in a transport direction T which runs parallel to the horizontal displacement axis H of the workpiece-carrier handling unit 20. The curved, dashed arrows show the action of bringing the respective workpiece carrier 16 from the respective pick-up position to the set-down position, the respective workpiece carrier 16 having workpieces 12, as it is moved from the pick-up position to the set-down position, initially being fed by the workpiece-carrier handling unit 20 to a standby position 21, in which the workpiece handling unit 22 removes all the workpieces 12 from one workpiece carrier 16 one after another, feeds them to the machining equipment 14 and, after machining, sets them down again on the workpiece carrier 16 in the standby position 21. Only then is the relevant workpiece carrier 16 moved from the standby position 21 into the respective set-down position by means of the workpiece-carrier handling unit 20.

In FIG. 1, the reference symbols of the workpiece-carrier stack unit 18 are indicated as extended by one number, the extension 0.1 meaning that the stack or parts of the stack is/are located in the feed position 40, the extension 0.2 meaning that the stack or parts of the stack is/are located in the intermediate position 44, and the extension 0.3 meaning that the arrangement of the stack or of the workpiece-carrier stack unit or parts thereof is/are located in the removal position 42.

FIG. 1a) shows the starting situation. In the feed position 40 and the intermediate position 44 in each case one workpiece-carrier stack unit 18 is ready. The workpiece-carrier handling unit 20 begins by picking up workpiece carriers 16 from the intermediate position and, following the machining of the individual workpieces—as outlined above—with setting them down in the set-down position, the latter position according to FIG. 1a) corresponding to the removal position 42. As soon as the workpiece-carrier stack unit 18 in the intermediate position has been processed (FIG. 1c)), the pick-up position and set-down position of the workpiece-carrier handling unit 20 are redefined, specifically being displaced by one position counter to the transport direction T, that is to say the feed position 40 becomes the pick-up position and the intermediate position 44 becomes the set-down position of the workpiece-carrier handling unit 20.

In this state of the machining operation, the completely machined workpiece-carrier stack unit 18 can be removed from the position 42.

As soon as the removal position 42 is free (FIG. 1d)), the workpiece-carrier stack units 18.1 and 18.2 located in the feed position 40 and in the intermediate position 44 are displaced in the transport direction T by one area unit by means of the stack transport unit 30 and, at the same time, the pick-up position and set-down position of the workpiece-carrier handling unit 20 is likewise defined by the control unit as being displaced by one position in the transport direction T. This is followed by the further processing of the workpiece-carrier stack unit 18.2 in the intermediate position 44 and the setting-down of the individual workpiece carriers 16 in the removal position 42. At the same time, in this state, a new workpiece-carrier stack unit 18.1 can be introduced into the feed position 40.

After the workpiece-carrier stack unit 18.2 in the intermediate position 44 has been processed completely, and there is a completely machined workpiece-carrier stack unit 18.3 in the removal position 42 (see FIG. 1f)), this workpiece-carrier stack unit 18.3 is removed from the removal position 42 and, at the same time, the pick-up and set-down positions for the workpiece-carrier handling unit 20 are defined as the position displaced by one unit counter to the transport direction T. This method step corresponds to the method step already described in accordance with FIG. 1c). After that, the method steps according to FIG. 1g) and FIG. 1h) are repeated in accordance with FIG. 1d) and 1e). The result is the repetition of the method steps according to FIG. 1c), d), e) in the further method sequence.

The respective pick-up position and set-down position to be redefined in each case for the workpiece-carrier handling unit 20 is provided by the control unit 32 which has already been mentioned above but is not specifically illustrated in FIG. 1, which likewise controls the movement sequence, coordinated therewith, of the stack transport unit 30.

Also illustrated in FIG. 1, schematically in the respective situation, are protecting walls 26.1 and 26.2 which can be introduced and which ensure that when workpiece-carrier stack units 18 are being introduced or removed, no contact is possible with the other area, in which machining is currently taking place. This measure serves for working safety.

The displacement of the workpiece-carrier stack units 18 by one area unit in the transport direction T as soon as the removal position 42 is free (FIG. 1*d*), *g*)), can also take place when a workpiece carrier 16 has been removed from its pick-up position and is located in the standby position, that is to say in the access phase of the gripper 28 of the workpiece handling unit 22.

Figure 3:
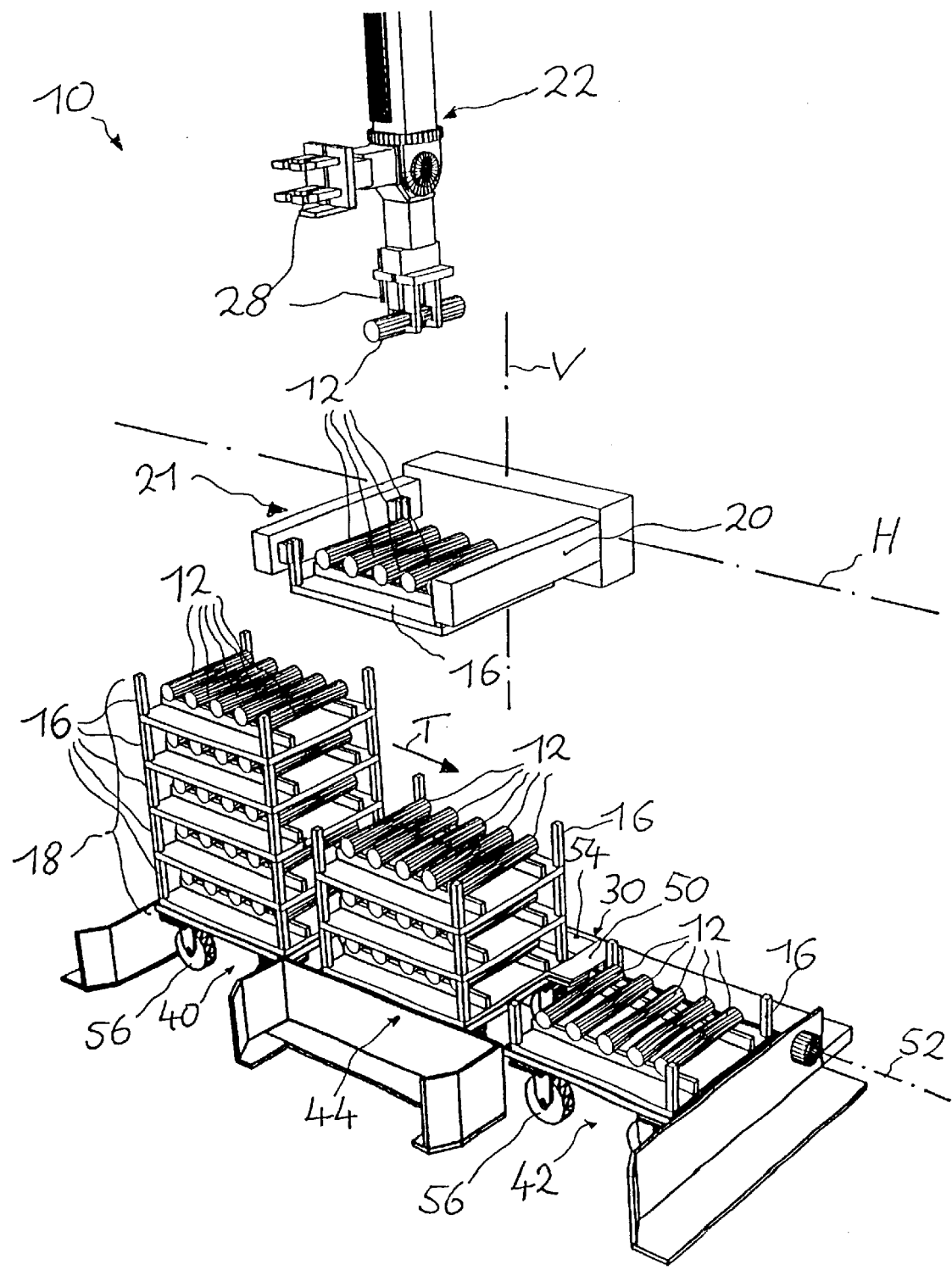
FIG. 3 shows a schematic detailed perspective illustration of the device according to FIG. 2 in the stack-feed and stack-removal area.

FIG. 3 shows in schematic form a state in which the intermediate position 44 has been defined as the pick-up position for the workpiece-carrier handling unit 20, and the removal position 42 has been defined as the set-down position for the workpiece-carrier handling unit 20. In the feed position 40, a full workpiece-carrier stack unit 18.1 with completely populated workpiece carriers 16 has already been reintroduced.

Figure 4:
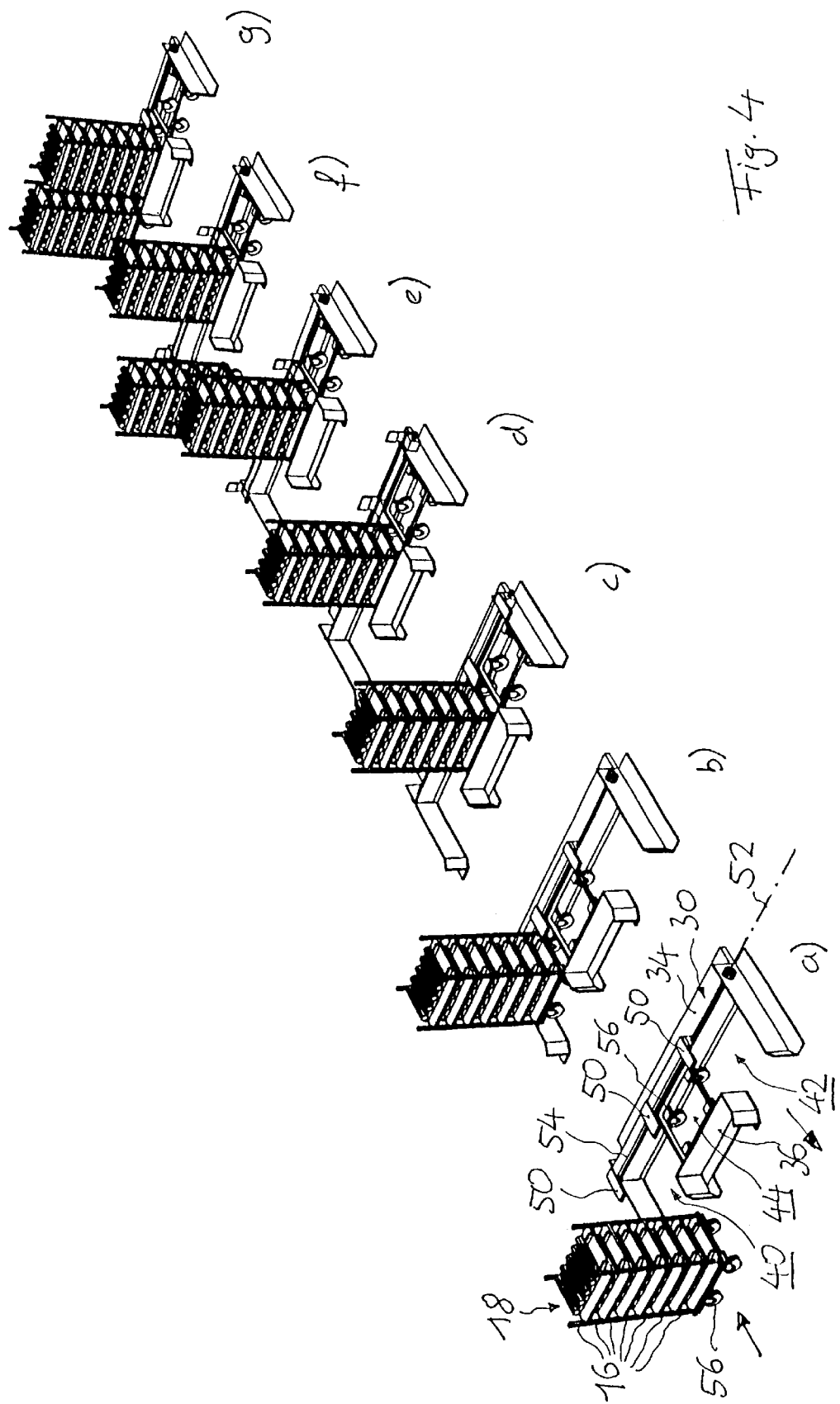
FIG. 4 shows a schematic perspective illustration of the step-by-step charging of the handling device with workpiece-carrier stack units at the beginning of the method.

One constructional embodiment of a stack transport unit 30 is illustrated schematically in FIG. 4, using the charging of the device at the start of the method.

The stack transport unit 30 has an essentially C-shaped frame profile 34 which is arranged at the bottom and whose web height is selected such that, in terms of internal contours, three workpiece-carrier stack units 18 can be arranged spaced apart from one another.

Located opposite the web of the frame profile 34 is a further guide profile 36 at the bottom, which essentially has a length which corresponds to the intermediate position 44, in such a way that on the top and bottom there is an opening through which a workpiece-carrier stack unit 18 can be moved into the feed position 40 or, respectively, can be moved out of the removal position 42.

The web of the frame profile 34 and the guide profile 36 have the effect of linearly guiding the workpiece-carrier stack units 18 which are present such that they can be displaced within the stack transport unit 30.

Parallel to the web of the frame profile 34 is a rotary-shaft profile 52, on which a profile unit 54 with projecting units 50 is mounted such that it can be displaced longitudinally in the direction of the axis of rotation 52 and rotatably about the axis of rotation 52. In this case, the profile unit 54 has a height of approximately ⅔ of the web height of the frame profile 34, the projecting units 50 being arranged at the end and at the centre of the profile unit 54. In the initial state according to FIG. 4*a*), the projecting units 50 are folded forwards. A first workpiece-carrier stack unit 18 is moved into the feed position 40 (FIG. 4*b*)). The displacement and rotary movement of the profile unit 40 is provided via assemblies which are not illustrated but which are activated by a control unit (not illustrated). According to FIG. 4*c*), following the introduction of the first workpiece-carrier stack unit 18, the latter is displaced into the intermediate position by means of the stack transport unit 30. The profile unit 54 is then rotated, so that the projecting unit 50 comes out of engagement with the first workpiece-carrier stack unit 18 (FIG. 4*d*)). The profile unit 54 is then displaced back into its starting position again, and the projecting units 50 are folded forwards. Following the introduction of a further workpiece-carrier stack unit 18 into the feed position 40, the device is ready to start.

In the intermediate position 44, at the start, there is an empty roller carriage 56 which, because of the displacement of the first workpiece-carrier stack unit 18 according to FIG. 4*c*), is moved into the removal position 42.

It is also conceivable for the workpiece-carrier stack unit 18 to have only one workpiece carrier.

In addition, it is possible for the device to have a number of intermediate positions which, at the beginning of the handling method, can be populated with workpiece-carrier stack units.

What is claimed is:

1. A handling device for feeding and/or removing workpieces as unfinished parts to and/or from machining or assembly equipment for machining and/or assembly purposes and for picking up workpieces as finished parts after machining and/or assembly, the handling device comprising:
   (a) workpiece carriers, on which the workpieces are arranged;
   (b) workpiece-carrier stack units, which have workpiece carriers arranged one above another;
   (c) a workpiece handling unit, which removes the workpieces from the respective workpiece carrier and feeds them to the machining and/or assembly equipment and, after machining/assembly, sets them down again on the workpiece carrier;
   (d) a workpiece-carrier handing unit, which feeds the respective workpiece carriers having unmachined workpiece and belonging to a workpiece-carrier stack unit to the workpiece handling unit, from a pick-up position into a standby position and, after its workpieces have been machined, sets this workpiece carriers down from the standby position into a set-down position of a further workpiece-carrier stack unit;
   (e) a stack transport unit, which transports the workpiece-carrier stack units within the device in a transport direction (T), specifically from a feed position to which the workpiece-carrier stack units having the unmachined workpieces are fed from outside, as far as a removal position, from which the workpiece-carrier stack units having the machined workpieces are removed to the outside; wherein
      between the feed position and the removal position there is at least one further intermediate position for one workpiece-carrier stack unit in each case;
      the stack transport unit being constructed such that it can displace at least two workpiece-carrier stack units arranged upstream of the removal position by one position in the transport direction (T) to the removal position;
      a control device being constructed such that it activates the components in such a way that
         the workpiece-carrier handling unit removes the workpiece carriers having workpieces to be machined in a pick-up position and, after their workpieces have been machined, sets the workpiece carriers down in a set-down position; and
         as soon as there is a completely machined workpiece-carrier stack unit in the removal position the pick-up and set-down positions of the workpiece-carrier handling unit are displaced by one position in the direction opposite to the transport direction (T); and
         after the workpiece-carrier stack unit has been removed from the removal position, the workpiece-carrier stack units located upstream of the removal position are displaced at least partly by one position in the transport direction (T) by means of the stack transport unit and, at the same time, the pick-up position and set-down position of the workpiece-carrier handling unit is also displaced by one position in the transport direction (T) and, as a result, a workpiece-carrier stack unit having workpiece carriers with unmachined workpieces can be introduced into the feed position.

2. Handling device according to claim 1, wherein between the feed position and the removal position there is a single intermediate position.

3. Handling device according to claim 1, wherein
the workpiece-carrier handling unit is adapted to be displaced about a horizontal and vertical axis (V), and the transport direction of the stack transport unit is arranged essentially parallel to a horizontal axis (H) of the workpiece-carrier handling unit.

4. Handling device according to claim 1, wherein
there are mobile protective walls which, when workpiece-carrier stack units are being fed or when workpiece-carrier stack units are being removed, block off the area of the adjacent position, in which machining takes place.

5. Handling device according to claim 1, wherein the workpiece-carrier handling unit performs the transport tasks of the stack transport unit, as a result of which the latter can be dispensed with.

6. Handling device according to claim 1, wherein
the stack transport unit is arranged within a linear guide and, between the respective workpiece-carrier stack units, has projecting units that can be pivoted in.

7. Handling device according to claim 1, wherein
the stack transport unit has a chain drive with assemblies which can be activated.

8. Handling device according to claim 1, wherein
the stack transport unit has a push-rod drive which can be activated via drive assemblies.

9. Handling device according to claim 6, wherein
the stack transport unit has rotary shaft unit, on which there are projecting units which are arranged so that they can be displaced longitudinally by means of an assembly and rotated by means of an assembly.

10. Handling device according to claim 1, wherein
on an underside, the workpiece-carrier stack units are constructed as roller carriages or units that can be moved statically.

11. A method of handling workpieces which are mounted on workpiece carriers, the said workpiece carriers being stacked to form workpiece-carrier stack units, the workpiece-carrier stack units being fed to a feed position from outside, fed in the transport direction (T) by means of a stack transport unit or a workpiece-carrier handling unit to a removal position, the workpiece-carrier handling unit feeding the individual workpiece carriers to a standby position, to which the workpiece handling unit makes access, the method comprising the steps of:

a) feeding one workpiece-carrier stack unit to the feed position;

b) transporting the workpiece-carrier stack unit in the transport direction (T) into an intermediate position;

c) if appropriate, repeating steps a) to c) in accordance with the number of intermediate positions;

d) removing one workpiece carrier by means of the workpiece-carrier handling unit from an intermediate position currently defined as a pick-up position to feed it to a machining position;

e) removing the workpieces and feeding machining/assembly equipment by means of the workpiece handling unit and setting the workpiece down on the workpiece carrier after machining, until the workpieces of the respective workpiece carrier have been machined completely;

f) removing the workpiece carrier from the machining position by means of the workpiece-carrier handling unit and setting it down in the removal position currently defined as the set-down position;

g) repeating steps d) to f) until the workpiece-carrier stack unit in the current pick-up position has been processed completely;

h) displacing the current pick-up and set-down positions in the direction opposite to the transport direction (T) by at least one position and removing the machined workpiece-carrier stack unit from the removal position;

i) displacing the workpiece-carrier stack units arranged upstream of the removal position by one position in the transport direction (T) and simultaneously displacing the pick-up/set-down position of the workpiece-carrier handling unit by one position in the transport direction (T);

j) feeding a further workpiece-carrier stack unit into the feed position from outside; and k) repeating method steps d) to i).

12. A method according to claim 11, wherein
the pick-up position and the set-down position of the workpiece-carrier handling unit are defined as adjacent positions.

13. A method according to claim 11, wherein
the workpiece-carrier stack units located upstream of the removal position are displaced by the stack transport unit or workpiece-carrier handling unit in a transport direction (T) which runs parallel to a horizontal axis (H) of the workpiece-carrier handling unit.

14. A method according to claim 11, wherein:

a) the workpiece handling unit feeds a set of workpieces from a workpiece carrier unit individually or jointly to the machining equipment;

b) the workpiece carrier unit which is then emptied is fed to an intermediate storage position; and e) after the processing of all the workpiece-carrier/stack units to be machined, the workpieces still in the machining equipment are fed to the empty workpiece carrier unit.

* * * * *

UNITED STATES PATENT AND TRADEMARK OFFICE
CERTIFICATE OF CORRECTION

PATENT NO. : 6,340,282 B1
DATED : January 22, 2002
INVENTOR(S) : Ralf Bar and Georg Deponte It is certified that error appears in the above-identified patent and that said Letters Patent is hereby corrected as shown below:

<u>Title page,</u>
Item [73], Assignee, delete "Arthur Bar GmbH, Gemmingen (DE)"
and substitute -- Artur Bar GmbH, Gemmingen (DE) --

Signed and Sealed this

Thirtieth Day of July, 2002

*Attest:*

JAMES E. ROGAN
*Attesting Officer*  *Director of the United States Patent and Trademark Office*